May 23, 1961 L. G. MORTENSEN 2,985,486
APPARATUS FOR CONVEYING MATERIALS
Filed Oct. 5, 1959 4 Sheets-Sheet 4

United States Patent Office 2,985,486
Patented May 23, 1961

2,985,486
APPARATUS FOR CONVEYING MATERIALS
Lewis George Mortensen, 191 Walker St., North Sydney, New South Wales, Australia
Filed Oct. 5, 1959, Ser. No. 844,374
Claims priority, application Australia Oct. 8, 1958
11 Claims. (Cl. 302—49)

This invention relates to apparatus for conveying materials and more particularly to apparatus for conveying liquids, granular materials such as sand or cement (dry or damp) and semi-liquid materials.

The principal object of the invention is to provide improved apparatus for conveying materials of the kind set out above by carrying such materials into a pressurised container or tube for subsequent conveying by pneumatic or hydraulic means.

Apparatus according to the invention may be used in suitable circumstances to effect a considerable saving in capital cost and labour as compared with equipment at present in use. It may, for example, be used in the construction of a concrete spraying apparatus which is more easily portable and which requires less labour for its operation and supervision than existing apparatus used for the same purpose.

The invention consists broadly in apparatus for the conveying of materials of the kind set out above including essentially a tube of resiliently flexible material having a substantially smooth interior surface, means associated with said tube to resist longitudinal extension thereof and means for adjusting the effective internal diameter of the tube, substantially throughout its length, the tube having formed at a position in its wall at least one inlet aperture adapted for connection to a supply of pneumatic or hydraulic fluid under pressure and an outlet aperture arranged substantially opposite said inlet aperture adapted for connection to a delivery pipe, a plurality of stopper members spaced apart and linked together to form a closed chain passing through the tube, each stopper member fitting sufficiently closely within the tube to prevent loss of material being conveyed, the linkage between adjacent stoppers being such as to maintain the stoppers in a stable relationship within the tube, means for moving the chain of stoppers continuously through the tube and means for filling material into spaces between adjacent stopper members prior to entering the tube.

For feeding material into the spaces between adjacent stopper members it is preferred that the chain of stoppers should be passed through the lower part of a hopper having means for forcing material therein into the said spaces.

Figure 1:
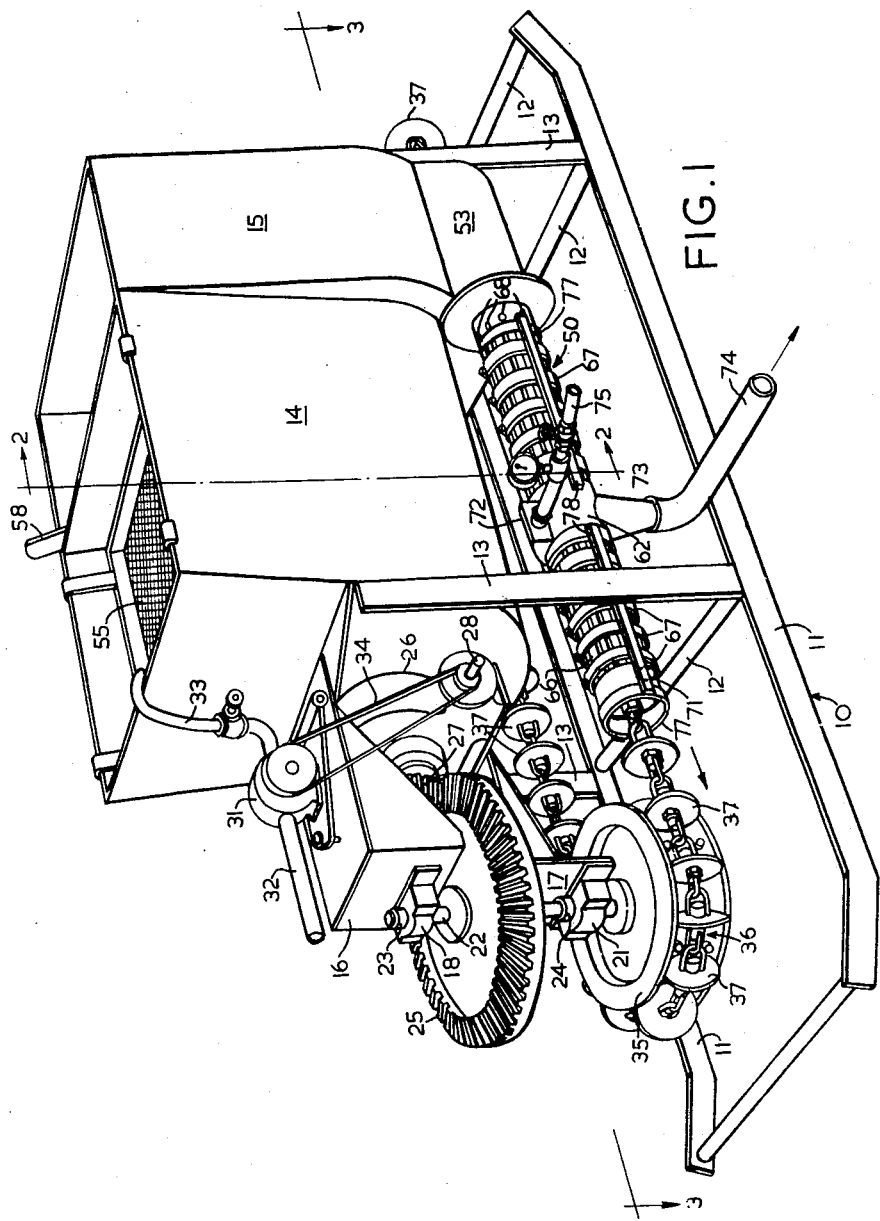
Figure 2:
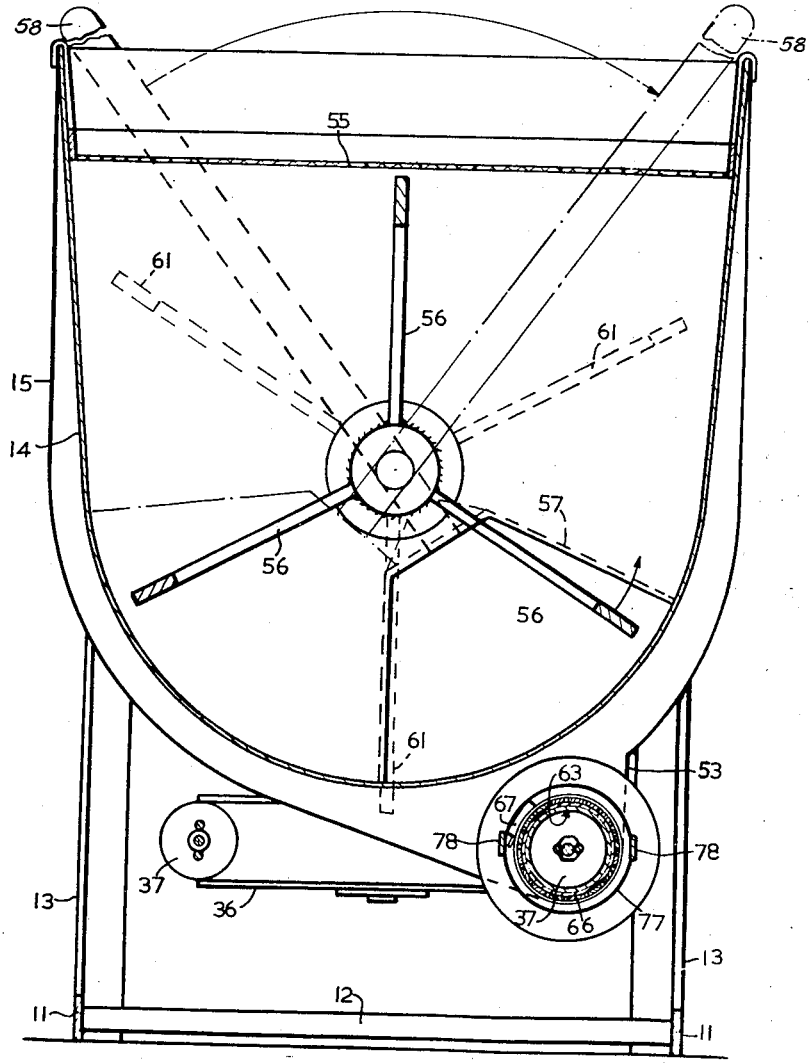
Figure 3:
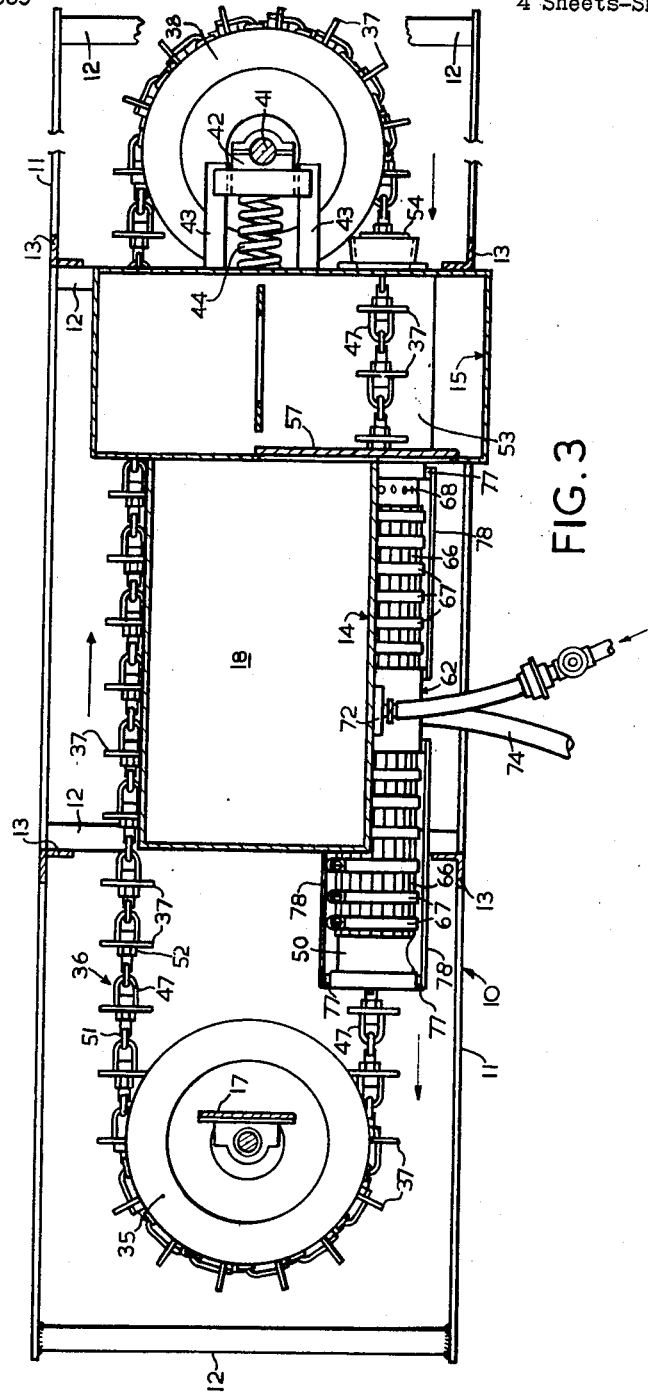
Figure 4:
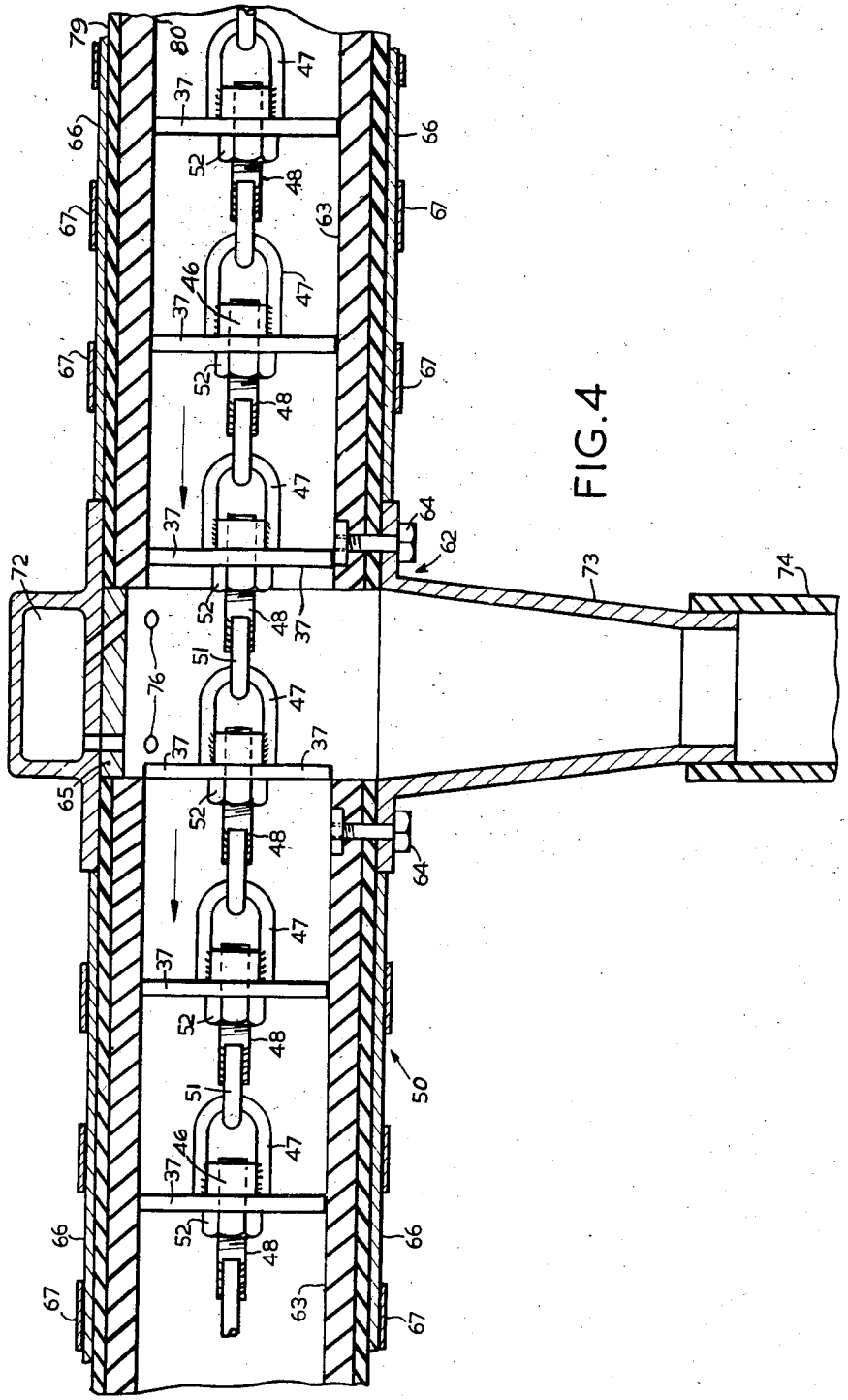

In order that the invention may be better understood and put into practice a concrete spraying apparatus incorporating a preferred form thereof is hereinafter described, by way of example, with reference to the accompanying drawings in which:

Fig. 1 is a perspective view of a concrete spraying apparatus incorporating the invention, Fig. 2 is a sectional elevation of the apparatus on plane 2—2 of Fig. 1, Fig. 3 is a sectional plan view on plane 3—3 of Fig. 1, and Fig. 4 shows to an enlarged scale the central portion of the tube showing the means for pneumatically removing material from the tube.

The apparatus shown in Fig. 1 consists of a rectangular framework 10 made up of longitudinal members 11 and lateral members 12. It also includes four upright members 13 which between them support a mixing hopper 14 and a feeding hopper 15. A pair of fabricated steel brackets 16 and 17 carry bearing blocks 18 and 21 in which a vertical shaft 22 runs. The shaft 22 is supported by means of collars 23 and 24 secured to the shaft and incorporating suitable thrust bearings.

At the upper end of the shaft 22 is attached a large bevel gear wheel 25 which is driven from a reduction gear enclosed within casing 26, through the bevel pinion 27. The reduction gear is driven by means of a drive shaft 28 to which a power source such as a petrol engine may be attached. A water pump 31 having inlet and outlet pipes 32 and 33 respectively is driven through the belt 34. This pump is used to supply water for the hydration of the concrete mix during the operation of the machine.

To the lower end of the shaft 22 is attached a pulley 35 which serves to drive a continuous chain 36 of stopper members 37 each consisting of a 3″ steel disc ¼″ thick, the stopper members being spaced apart about 2½″ and linked together in the manner described below. The chain passes around a similar pulley 38 mounted at the other end of the frame 10 for rotating on a shaft 41 in bearings 42 one of which is seen in Fig. 3. The bearings 42 are slidable on the members 43 and coil springs 44, one of which is shown in Fig. 3, are provided to maintain the tension in the chain 36.

The pulleys 35 and 38 have concave driving surfaces to accommodate the stopper members 37. On the concave surface of the driving pulley 35 there are provided teeth arranged to engage alternate stopper members as the chain passes around the pulleys, each "tooth" consisting of a pair of cap screws (see Fig. 1) which are screwed into the concave portion of the pulley so as to project to a distance of about a quarter of an inch. It will be appreciated that the drive is thus transmitted to each stopper member near its periphery. This arrangement has the advantage that stoppers can be placed relatively close together without the driving teeth fouling the stopper members as they approach the driving pulley.

Each stopper member 37 consists of a steel disc having at one side an internally threaded nut or sleeve 46 to which is welded a half link 47. Into the nut or sleeve 46 a threaded bolt 48 is screwed. To the head of this bolt a half link 51 is welded. The stopper member 37 is held against the ends of the half link 47 by means of a lock nut 52. A shackle or joining link (not shown) is provided at one point in the chain so that it may be removed from the pulleys and spread out straight for effecting adjustments or replacements. This form of construction enables any stopper member to be easily removed and the distance between adjacent stopper members to be adjusted by screwing the bolt 48 into or out of the nut or sleeve 46. It also maintains the stopper members in a stable relationship as any tendency of a stopper member to tilt is resisted by the half link 47 of the stopper member ahead of it, which tends to prevent movement of the half link 51 away from the centre line of the chain. It should be emphasised however that many other arrangements may be used successfully, for example, the stopper members may be joined rigidly in pairs to form in effect a series of spools which are linked to permit pivotal movement about two axes, alternatively they may be mounted at intervals on a wire rope, each stopper member being clamped to the rope by a suitable screw.

During a portion of its run the chain of stopper members passes through the tube 50, the construction of which will be described in detail with reference to Fig. 4. The tube 50 is attached at one end to the feeding hopper 15, and, prior to entering the tube 50, the stopper members pass through the lowermost portion 53 of the hopper 15, being led into it by the tapered tube 54, and, in passing pick up the concrete mix to be conveyed into the tube.

Raw materials for making concrete are passed through the screen 55 into the mixing hopper 14, water is supplied and the materials are mixed by means of the paddles 56 which are driven from the reduction gear 26. After having been mixed sufficiently the gate 57 which covers an aperture between the hoppers 14 and 15 is opened by moving the lever 58 to the dotted line position shown in Fig. 2. This permits the mixed material to pass into the feeding hopper 15 where a series of paddles 61 rotated on the same shaft as the paddles 56 act to force the material into the portion 53 of the hopper thus filling with concrete mix the spaces between adjacent stopper members 37 lying within the hopper. As the chain of stopper members moves round it carries the concrete mix into the tube.

The central part of the tube is shown to an enlarged scale in Fig. 4. The tube is made up of two separate halves each of which is long enough to accommodate three stopper members and which are joined by a fitting 62 described below. Each half consists of a rubber tube 63 having an external diameter of 4½" which is made up of an outer layer of reinforced hose 79 of a thickness of about ¼" and an inner lining 80 about ½" thick of pure rubber sometimes known as gum rubber, or the material sold under the name "Linatex." These materials have the characteristic of being tough yet extremely elastic in that they can be easily deformed to a considerable extent without damage. The inner end of each half 63 is stuck and bolted by means of bolts 64 to the fitting 62. An arcuate saddle of metal 65 fits between the ends of the halves 63 over the upper half of the tube.

Each half 63 is surrounded by ten 1¼" x 20 gauge longitudinally extending metal strips 66 curved laterally to correspond with the circumference of the tube. Each strip is spaced slightly apart from the adjacent strips on either side. The strips are held in position by eight hose clips 67 each ½" wide, the circumference of which may be adjusted by means of a screw. This arrangement of strips and clips gives the halves of the tube rigidity and also enables the effective internal diameter of the tube to be adjusted at any point along its length, either initially or to take up wear during use. It will be appreciated that for the stopper members 37 to pass smoothly through the tube its internal surface must correspond as closely as possible to that of a cylinder. On setting up a machine this may be achieved by tightening, loosening or deforming one or more of the clips 67 until a stopper member will pass smoothly through the tube while making a close fit with its inner surface.

There are provided at the end of the tube adjacent the hopper 15 a plurality of breather holes 68 which pass through the wall of the half 63 and which allow any air passing back from the fitting 62 to escape before it reaches the hopper 15 where it might interfere with the filling of the spaces between the stoppers. The holes are preferably made in two parts, a smaller outwardly expanding portion through the inner gum rubber lining of the tube and a larger parallel sided portion in the outer layer of reinforced hose as this arrangement has been found effective in preventing the holes from becoming blocked by permitting the ready escape of trapped particles.

At the other end of the tube there is provided an exhaust port 71 which allows air under pressure to escape from the tube before the leading stopper member of any adjacent pair of stopper members has reached the end of the tube.

The fitting 62 provides an inlet 72 for air under pressure and an outlet 73 for concrete mix to pass into the delivery pipe 74 which leads to a spray nozzle (not shown) of conventional construction. Air at a pressure of about 65 lbs./sq. in. is supplied to the inlet 72 through a hose 75 from a suitable compressor. The air passes from the inlet 72 through a series of holes 76 into tube 50.

The holes 76 are preferably arranged so that the air enters the tube in a large number of small jets which are directed so as to remove the concrete mix from between the adjacent stopper members as completely and cleanly as possible. If a single air inlet is used there is a tendency for the air to form a relatively narrow channel through the concrete mix and to leave some of it behind. As may be seen from Fig. 4 it is preferable that some of the jets should be directed towards approaching stopper members.

In order to prevent stretching of the halves of the tube with a consequent decrease of internal diameter, the outer ends are anchored by means of rings 77 secured by means of bolts to the ends of the tube and inextensible longitudinal members 78 extending between the rings 77 and the fitting 62. The same result may be achieved by incorporating in the material of the tube longitudinally extending inextensible threads of cotton, nylon or other suitable material which will act to resist longitudinal stretching.

The apparatus described above may be operated by two men, one of whom loads the raw materials into the mixing hopper while the other manipulates the spraying nozzle.

In operation the raw materials are mixed in the mixing hopper and then allowed to pass into the feeding hopper, where they are fed into the spaces between the stopper members. The concrete mix is then carried by the chain of stoppers into the tube. Once inside the tube the space between adjacent stoppers forms an almost completely sealed compartment which is moved against an air pressure gradient rising from atmospheric pressure outside the tube to about 65 lbs./sq. in. in the central part of it. The fact that the stopper members fit closely against the inner surface of the tube and the fact that there are three stopper members in each half effectively seals the central part of the tube against any serious loss of air by leakage along it.

As soon as the leading stopper member of any pair of stoppers enters the space within the fitting 62 between the inner ends of the halves 63, the material behind it is subjected to a stream of air from the inlet 72 which carries it into the delivery pipe 74. As the chain moves forward the space between the stopper members is swept clear of material by the jets of air from the holes 76. In this manner material is fed forward continuously to a nozzle at the end of the delivery pipe 74.

The empty spaces between stopper members pass along the left hand half of the tube as seen in Fig. 4 until they reach the exhaust port 71 through which the air contained in them (which is at a pressure approximately equal to the pressure of the inlet 74) is discharged to the atmosphere.

The embodiment of the invention described above is given by way of example only and while it is intended for concrete spraying, it may be used for placing concrete or simply conveying material along the delivery pipe for delivery at a desired point. A variety of modifications will occur readily to those skilled in the art within the scope of the succeeding claims.

It is, for example, not essential to use precisely the form and materials of tube and stopper construction described. In any particular form of the invention the material of the tube and discs must be chosen to give an adequate sealing effect between them and must be such as to limit the rate of wear of the parts to an economic level. It is, however, essential if the apparatus is to be practically useful, that the tube should be of elastically flexible material. Any similar apparatus embodying a rigid tube and stopper members of a resilient nature has been found to be commercially impracticable owing to the wear which takes place on the stoppers.

What I claim is:

1. Apparatus for the conveying of materials comprising a tube of resiliently flexible material having a substantially smooth interior surface, the tube including two parts, a fitting joining said parts and in which inlet and outlet apertures are provided, means associated with each part of said tube to resist longitudinal extension thereof and means for adjusting the effective internal diameter of each part of the tube substantially throughout its length comprising a plurality of clamping members surrounding said tube and being individually adjustable as to circumferential length, the said inlet aperture being adapted for connection to a supply of pressure fluid and the said outlet aperture being arranged substantially opposite said inlet aperture and adapted for connection to a delivery pipe, a plurality of stopper members spaced apart and linkage means connecting said stopper members together to form a closed chain passing through the tube, each stopper member fitting closely within the tube to prevent loss of material being conveyed, the linkage means between adjacent stoppers being such as to maintain the stoppers in a stable relationship within the tube, the linkage means between the stopper members and the length of each part of the tube being so related that at least three stopper members may lie simultaneously within each of said parts of the tube, means for moving the chain of stoppers continuously through the tube and means for filling material into spaces between adjacent stopper members prior to entering the tube.

2. Apparatus as claimed in claim 1 comprising and wherein the interior of the tube is lined with a thick layer of elastic material.

3. Apparatus as claimed in claim 1 wherein the means to resist longitudinal extension consists of threads of relatively inextensible material incorporated in the tube and extending longitudinally therein.

4. Apparatus as claimed in claim 1 comprising fixed parts and wherein the means to resist longitudinal extension consists of members connecting the parts of the tube to fixed parts of the apparatus.

5. Apparatus as claimed in claim 1 wherein air breather holes are provided in the wall of the tube adjacent the end of the tube at which stopper members enter.

6. Apparatus as claimed in claim 1 wherein the means for adjusting the effective internal diameter of each part of the tube throughout its length consists of a plurality of longitudinally extending strips on the outer surface of the tube and a plurality of clips surrounding the said strips and arranged at intervals along the tube, the circumferential length of each clip being adjustable.

7. Apparatus as claimed in claim 1 wherein each stopper member consists of a steel disc.

8. Apparatus as claimed in claim 1 comprising and wherein the chain of stopper members passes around a pair of pulleys, one of which is driven, the driven pulley including circumferential teeth adapted to transmit drive to the stopper members near their peripheries.

9. Apparatus as claimed in claim 1 wherein there are a plurality of inlet apertures arranged so that jets of incoming pressure fluid are directed to remove material between adjacent stopper members on either side of said apertures.

10. Apparatus as claimed in claim 1 wherein the means for filling material into spaces between adjacent stopper members consists of a hopper surrounding the entrance to said tube and rotatable paddles in said hopper arranged to act to force material in the hopper into spaces between adjacent stopper members.

11. Apparatus as claimed in claim 10 comprising adjacent the said hopper a mixing hopper in which batches of material may be mixed, the said hoppers including a common wall in which an aperture is provided whereby material mixed in said mixing hopper may be transferred to the first mentioned hopper, and a gate to close said aperture.

References Cited in the file of this patent
UNITED STATES PATENTS

| | | |
|---|---|---|
| 1,048,019 | Wilson | Dec. 24, 1912 |
| 1,069,308 | Wilson | Aug. 5, 1913 |
| 1,179,488 | Wilson | Apr. 18, 1916 |
| 2,592,815 | Lukes | Apr. 15, 1952 |